United States Patent
Lu et al.

(10) Patent No.: US 12,207,323 B2
(45) Date of Patent: Jan. 21, 2025

(54) CONNECTION MANAGEMENT METHOD AND APPARATUS, TERMINAL AND SYSTEM

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 202 days.

(21) Appl. No.: 17/394,168

(22) Filed: Aug. 4, 2021

(65) Prior Publication Data
US 2021/0410209 A1    Dec. 30, 2021

Related U.S. Application Data

(63) Continuation of application No. PCT/CN2019/075110, filed on Feb. 14, 2019.

(51) Int. Cl.
*H04W 76/11*    (2018.01)
*H04W 28/02*    (2009.01)

(52) U.S. Cl.
CPC ........ *H04W 76/11* (2018.02); *H04W 28/0215* (2013.01); *H04W 28/0252* (2013.01)

(58) Field of Classification Search
CPC ......... H04W 4/08; H04W 4/40; H04W 8/005; H04W 48/16; H04W 56/0095;
(Continued)

(56) References Cited

U.S. PATENT DOCUMENTS

2018/0234895 A1    8/2018    Shin et al.
2020/0229249 A1*   7/2020    Cheng .................... H04W 4/40
(Continued)

FOREIGN PATENT DOCUMENTS

| CN | 106559337 A | 4/2017 |
| CN | 106658424 A | 5/2017 |
| CN | 106973356 A | 7/2017 |

OTHER PUBLICATIONS

3GPP "Study on architecture enhancements for EPS and 5G System to support advanced V2X services (Release 16)" Technical Report 23.786 V1.0.0; Dec. 2018. 8 pages.
(Continued)

*Primary Examiner* — Harun Chowdhury
(74) *Attorney, Agent, or Firm* — PERKINS COIE LLP (57) ABSTRACT

Provided in the implementations of the present disclosure are a connection management method and apparatus, a terminal and a system, relating to the field of communications. The method comprises: a first terminal sending, to a second terminal, first connection management information corresponding to a first service, wherein the first connection management information is used for managing a connection between the first terminal and the second terminal, and different services correspond to different pieces of connection management information; and the first terminal receiving first response information sent by the second terminal, wherein the first response information is a response to the first connection management information.

11 Claims, 6 Drawing Sheets

(58) Field of Classification Search
CPC ..... H04W 76/10; H04W 76/11; H04W 76/14; H04W 76/27; H04W 80/00
USPC .......................................... 370/252, 329, 331
See application file for complete search history.

(56) References Cited

U.S. PATENT DOCUMENTS

| | | | | |
|---|---|---|---|---|
| 2021/0400738 | A1* | 12/2021 | Ali | H04W 4/08 |
| 2022/0046564 | A1* | 2/2022 | Shimoda | H04W 80/00 |
| 2022/0124466 | A1* | 4/2022 | Ali | H04W 4/40 |

OTHER PUBLICATIONS

Examination Report for European Application No. 19915242.2 issued Nov. 4, 2022. 8 pages.
First Office Action for Chinese Application No. 201980064560.4 issued Nov. 3, 2022. 18 pages with English translation.
Notice of Reasons for Refusal for Japanese Application No. 2021-545930 issued Jan. 20, 2023. 6 pages with English translation.
3GPP TSG RAN WG1 Meeting #95—R1-1812399—Spokane, USA, Nov. 12-16, 2018—Fraunhofer HHI, Fraunhofer IIS, Designs for NR V2X Mode 2 Resource Allocation (10 pages).
International Search Report issued Oct. 22, 2019 of PCT/CN2019/075110 (4 pages).
3GPP "Study on architecture enhancements for EPS and 5G System to support advanced V2X services (Release 16)" 3GPP TR 23.786 V0.10.0 (Dec. 2018). 109 pages.
Extended European Search Report for European Application No. 19915242.2 issued Jan. 19, 2022. 8 pages.
Vodafone "New SID: Study on NR V2X" RP-181480; 3GPP TSG RAN Meeting #80; La Jolla, USA; Jun. 11-14, 2018. 6 pages.
Second Office Action of Japanese application No. 2021-545930 issued on Jul. 28, 2023, 4 pages.

* cited by examiner

CONNECTION MANAGEMENT METHOD AND APPARATUS, TERMINAL AND SYSTEM

CROSS-REFERENCE TO RELATED APPLICATION

The present application is a continuation application of International PCT Application No. PCT/CN2019/075110, filed on Feb. 14, 2019, the entire content of which is hereby incorporated by reference.

TECHNICAL FIELD

The present disclosure relates to the field of communications, in particular, to a connection management method and apparatus, a terminal and a system.

BACKGROUND

Vehicle to everything (V2X) is a communication network between vehicles, which can provide data communication with low-delay, high-reliability and security during high-speed movement of vehicles, and is widely used in the field of automatic driving, etc.

In Long Term Evolution-V2X (LTE-V2X), since broadcast services are mainly focused, and there is no concept of connection between terminals, no connection management mechanism is defined in LTE-V2X. However, in New Radio-V2X (NR-V2X), since unicast and multicast services need to be considered, a corresponding connection management mechanism needs to be designed for terminals.

SUMMARY

Implementations of the present disclosure provide a connection management method and apparatus, a terminal and a system, which can solve the problem that a connection management mechanism applied to NR-V2X is not involved in the related art and the traditional terminal-based connection management mechanism cannot be directly used in NR-V2X. Technical solutions are as follows.

In one aspect, an implementation of the present disclosure provides a method for connection management, including:

sending, by a first terminal, first connection management information corresponding to a first service to a second terminal, the first connection management information being used for managing a connection between the first terminal and the second terminal, wherein different services correspond to different connection management information; and receiving, by the first terminal, first response information sent by the second terminal, the first response information being a response to the first connection management information.

In another aspect, an implementation of the present disclosure provides a method for connection management, including:

receiving, by a second terminal, first connection management information corresponding to a first service sent by a first terminal, the first connection management information being used for managing a connection between the first terminal and the second terminal, wherein different services correspond to different connection management information; and sending, by the second terminal, first response information to the first terminal, the first response information being a response to the first connection management information.

In a further aspect, an implementation of the present disclosure provides an apparatus for connection management, including:

a first sending unit, configured to send first connection management information corresponding to a first service to a second terminal, the first connection management information being used for managing a connection between a first terminal and the second terminal, wherein different services correspond to different connection management information; and a first receiving unit, configured to receive first response information sent by the second terminal, the first response information being a response to the first connection management information.

In a further aspect, an implementation of the present disclosure provides an apparatus for connection management, including:

a third receiving unit, configured to receive first connection management information corresponding to a first service sent by a first terminal, the first connection management information being used for managing a connection between the first terminal and a second terminal, wherein different services correspond to different connection management information; and a third sending unit, configured to send first response information to the first terminal, the first response information being a response to the first connection management information.

In a further aspect, an implementation of the present disclosure provides a terminal, including a processor, a memory, a transmitter and a receiver, the memory being configured to store one or more instructions indicated to be executed by the processor, and the processor being configured to control the transmitter and the receiver to execute the method for connection management of the first terminal side described in the above aspect.

In a further aspect, an implementation of the present disclosure provides a terminal, including a processor, a memory, a transmitter and a receiver, the memory being configured to store one or more instructions indicated to be executed by the processor, and the processor being configured to control the transmitter and the receiver to execute the method for connection management of the second terminal side described in the above aspect.

In a further aspect, an implementation of the present disclosure provides a V2X system, including: a first terminal and a second terminal, the first terminal includes the first terminal described in the above aspect; and the second terminal includes the second terminal described in the above aspect.

In a further aspect, an implementation of the present disclosure provides a computer-readable medium, storing one or more instructions, the instructions being used for implementing the methods for connection management described in the above aspects.

BRIEF DESCRIPTION OF DRAWINGS

In order to explain the technical solutions of implementations of the present disclosure more clearly, drawings referred to in the description of the implementations will be briefly introduced below. Obviously, the drawings in the following description are only some implementations of the present disclosure. For those of ordinary skills in the art, other drawings may be obtained according to these drawings without paying an inventive effort.

DETAILED DESCRIPTION

In order to make objects, technical solutions and advantages of the present disclosure more clear, the implementations of the present disclosure will be described in further detail below with reference to the accompanying drawings.

The "module" mentioned herein generally refers to a program or instructions stored in a memory capable of realizing some functions. The "unit" mentioned herein generally refers to a functional structure divided with respect to logic, and the "unit" may be implemented by pure hardware or a combination of hardware and software.

The "multiple" mentioned herein refers to two or more. The "and/or" describes an association relationship between associated objects, indicating that there may be three relationships, for example, A and/or B may indicate three situations: A alone, A and B, and B alone. The symbol "/" generally indicates that objects before and after the symbol "/" is in an "or" relationship.

Figure 1:
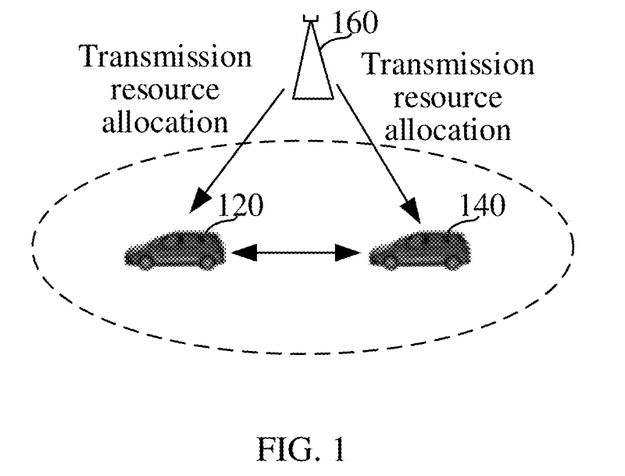
FIG. 1 is a schematic structure diagram of a V2X system provided according to an implementation of the present disclosure.

Referring to FIG. 1, FIG. 1 is a schematic structure diagram of a V2X system provided according to an implementation of the present disclosure. The V2X system may be an NR-V2X system of 5G NR. The V2X system includes: a first terminal 120 and a second terminal 140.

In a possible implementation, as shown in FIG. 1, the first terminal 120 and the second terminal 140 are both automobile terminals, and as an automobile terminal has a fixed power input, they are always in a continuous receiving state. For example, an automobile terminal is a vehicle machine (or on-board computer) installed on a vehicle.

Different from the conventional cellular system in which data communication is performed between terminals through an access network device (such as a base station), in the V2X system, the first terminal 120 and the second terminal 140 directly communicate with each other using SideLink (SL) transmission technology, thus achieving higher spectrum efficiency and lower transmission delay. There are two modes for data transmission between the first terminal 120 and the second terminal.

In the first mode, as shown in FIG. 1, the transmission resources of the terminals are allocated by an access network device 160, and the first terminal 120 and the second terminal 140 send data on the side links of the allocated transmission resources. The access network device may allocate resources for single transmission to the terminals, and may also allocate resources for semi-static transmission to the terminals.

In the second mode, the terminal selects from a pre-configured resource pool a transmission resource for data transmission, without the aid of the access network device for allocation.

The method for connection management provided according to each implementation of the present disclosure is used in a scenario for managing a connection between the first terminal 120 and the second terminal 140; and the acts with the first terminal being an execution subject are executed by the first terminal 120 and the acts with the second terminal being an execution subject are executed by the second terminal 140.

It should be noted that the V2X system shown in FIG. 1 may include two or more terminals. In this implementation, only the first terminal 120 and the second terminal 140 are taken as examples for schematic illustration, which does not constitute a limitation on the present disclosure.

In the V2X system, the network topology between terminals is a flat mesh structure, and a terminal may be either a sender of a unicast service or a receiver of another unicast service B, or may be either a central node (sending multicast messages) of a multicast service or a member node (receiving multicast messages) of another multicast service. This makes it difficult to determine, among the connected terminals, which terminal is a control terminal and which terminal is a controlled terminal. Further, since terminals are not distinguished as a control terminal and a controlled terminal in the traditional connection management mechanism, this mechanism can hardly be adopted in the V2X system.

Figure 2:
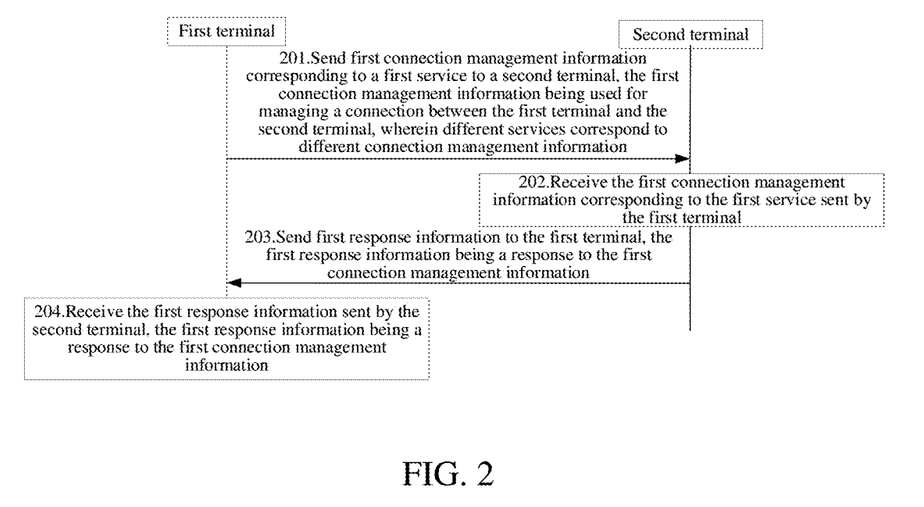
FIG. 2 is a flow chart of a method for connection management provided according to an implementation of the present disclosure.

Referring to FIG. 2, FIG. 2 is a flow chart of a method for connection management provided according to an implementation of the present disclosure. In this implementation, description is made by taking the case as an example where the method for connection management is applied to the V2X system shown in FIG. 1. The method includes acts 201-204. In act 201, a first terminal sends first connection management information corresponding to a first service to a second terminal, the first connection management information being used for managing a connection between the first terminal and the second terminal, wherein different services correspond to different connection management information.

Optionally, at least one of connection setup, connection release, connection measurement, connection configuration and capability reporting is realized through the first connection management information.

In act 202, the second terminal receives the first connection management information corresponding to the first service sent by the first terminal.

In act 203, the second terminal sends first response information to the first terminal, the first response information being a response to the first connection management information.

Optionally, the first response information includes content corresponding to the content in the first connection management information, and may include at least one of a connection setup response, a connection release response, a connection measurement report, a connection configuration response and a capability report.

In act 204, the first terminal receives the first response information sent by the second terminal.

Optionally, after receiving the first response information, the first terminal parses the first response information and determines, according to a parsing result, whether the connection meets a service requirement of the first service.

To sum up, an implementation of the present disclosure proposes a connection management mechanism for managing a connection between terminals based on a service, in the mechanism, the first terminal sends connection management information corresponding to the first service to the second terminal and receives a response of the second terminal to the connection management information, thus achieving the effect of managing the connection between terminals in the V2X system, and the mechanism can be adapted to the network topology between terminals in the V2X system.

It should be noted that, in the above implementation, the acts with the first terminal being the execution subject may be independently implemented as a method for connection management of the first terminal side, and the acts with the second terminal being the execution subject may be independently implemented as a method for connection management of the second terminal side, which will not be described in further detail here in this implementation.

Figure 3:
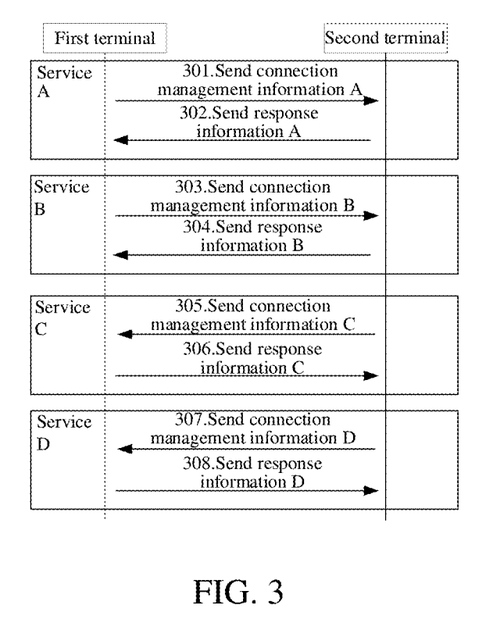
FIG. 3 is a schematic diagram of an implementation process of a method for connection management provided according to an example implementation.

In a possible implementation, when all connections between terminals are managed based on services, in an example, based on service A, service B, service C and service D, the connection management process between the first terminal and the second terminal is as shown in FIG. 3, in which the first terminal serves as a control terminal for service A and service B, and the second terminal serves as a control terminal for service C and service D.

In act 301, the first terminal sends connection management information A of service A to the second terminal.

In act 302, the second terminal sends response information A to the connection management information A to the first terminal.

In act 303, the first terminal sends connection management information B of service B to the second terminal.

In act 304, the second terminal sends response information B to connection management information B to the first terminal.

In act 305, the second terminal sends connection management information C of service C to the first terminal.

In act 306, the first terminal sends response information C to connection management information C to the second terminal.

In act 307, the second terminal sends connection management information D of service D to the first terminal.

In act 308, the first terminal sends response information D to connection management information D to the second terminal.

In a possible implementation, the first connection management information sent by the first terminal may include at least one of a service identifier of the first service, a first bearer identifier corresponding to the first service, and a first Quality of Service (QoS) flow identifier corresponding to the first service. Accordingly, the first terminal sends first connection management information for the first service to the second terminal according to the service identifier of the first service, the first bearer identifier or the first QoS flow identifier.

In a possible implementation, the first terminal may send the connection management information to the second terminal in at least one of the following ways:

1. sending the first connection management information to the second terminal according to a target address corresponding to the first service;

2. sending the first connection management information to the second terminal according to a source address corresponding to the first service;

3. sending the first connection management information to the second terminal through a first bearer corresponding to the first service; and 4. sending the first connection management information to the second terminal through a first QoS flow corresponding to the first service.

As a response to the first connection management information, the first response information sent by the second terminal may also include at least one of a service identifier of the first service, a first bearer identifier corresponding to the first service and a first QoS flow identifier corresponding to the first service. Accordingly, the second terminal may send the response information to the first terminal in at least one of the following ways:

1. sending the first response information to the first terminal according to a source address corresponding to the first service;

2. sending the first response information to the first terminal according to a target address corresponding to the first service;

3. sending the first response information to the first terminal through the first bearer corresponding to the first service; and 4. sending the first response information to the first terminal through the first QoS flow corresponding to the first service.

In addition, the content included in the first connection management information is related to the functions implemented according to the first connection management information. In a possible implementation, the first connection management information may include at least one of first connection setup information, first connection release information, first connection measurement information, first connection configuration information and first capability reporting information.

The first connection setup information is used for indicating to set up a connection corresponding to the first service.

The first connection release information is used for indicating to release the connection corresponding to the first service.

The first connection measurement information is used for indicating to measure the connection corresponding to the first service. The first connection configuration information includes at least one of a Service Data Adaptation Protocol (SDAP) protocol layer configuration, a Packet Data Convergence Protocol (PDCP) protocol layer configuration and a Radio Link Control (RLC) protocol layer configuration.

The first capability reporting information is used for indicating the second terminal to report a first capability and/or a second capability, the first capability refers to an available capability of the second terminal for the first service, and the second capability includes at least one of an SDAP protocol layer capability, a PDCP protocol layer capability or an RLC protocol layer capability.

As a response to the first connection management information, the first response information sent by the second terminal may also include at least one of a first connection setup response, a first connection release response, a first connection measurement report, a first connection configuration response and a first capability report.

The first connection setup response is a response when the connection corresponding to the first service is set up.

The first connection release response is a response when the connection corresponding to the first service is released.

The first connection measurement report refers to a measurement result of the connection corresponding to the first service.

The first connection configuration response includes at least one of an SDAP protocol layer configuration, a PDCP protocol layer configuration and an RLC protocol layer configuration.

The first capability report includes a first capability and/or a second capability, the first capability refers to an available capability of the second terminal for the first service, and the second capability includes at least one of an SDAP protocol layer capability, a PDCP protocol layer capability or a RLC protocol layer capability.

Figure 4:
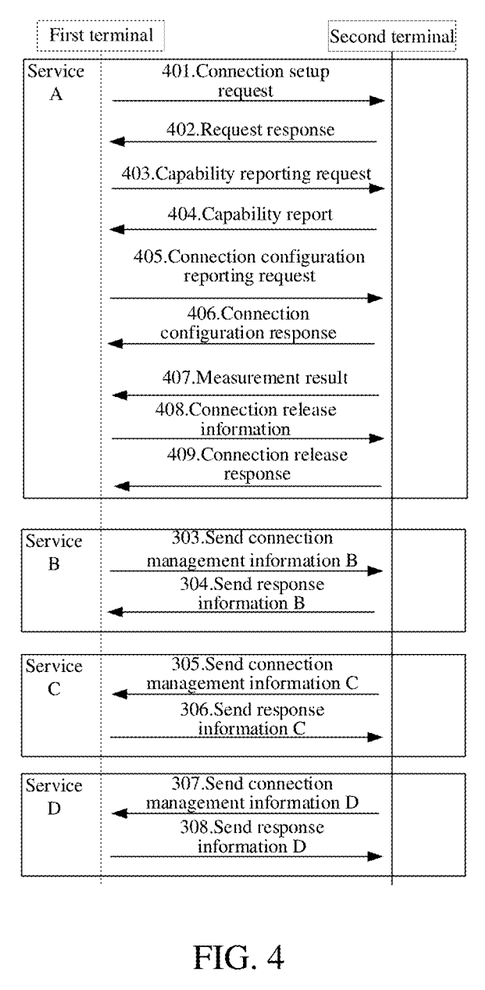
FIG. 4 is a schematic diagram of an implementation process of a method for connection management provided according to another example implementation.

For convenience of understanding, the case of performing connection management based on service A in FIG. 3 is taken as an example, and as shown in FIG. 4, the process of performing connection management specifically includes the following acts 401-409.

In act 401, the first terminal sends a connection setup request (corresponding to the first connection setup information) to the second terminal.

In act 402, the second terminal sends a request response (request ACK) (success or failure, corresponding to the first connection setup response) to the first terminal.

In act 403, the first terminal sends a capability reporting request (capability request) (corresponding to the first capability reporting information) to the second terminal.

In act 404, the second terminal sends a capability report (corresponding to the first capability report) to the first terminal.

In act 405, the first terminal sends a connection configuration reporting request (configuration) (corresponding to the first connection configuration information and the first connection measurement information) to the second terminal.

The connection configuration reporting request is used for requesting the second terminal to report at least one of a protocol layer parameter configuration (stack), a security parameter configuration (security) and a measurement configuration (measurement, meas).

In act 406, the second terminal sends a connection configuration response (configuration report) (corresponding to the first connection configuration response) to the first terminal.

Optionally, the connection configuration response includes a protocol layer parameter configuration and a security parameter configuration.

In act 407, the second terminal sends a measurement report (corresponding to the first connection measurement report) to the first terminal.

In act 408, the first terminal sends connection release information (release) to the second terminal.

In act 409, the second terminal makes a connection release response (release ACK).

In order to further simplify the connection management process, in a possible implementation, different services in the same configuration direction are not distinguished for a process, but processes in different configuration directions are distinguished (i.e., only the control terminals of the services are distinguished).

Unlike the case in the above implementation where the first connection management information is sent according to the address (the source address or the target address), the bearer or the QoS flow corresponding to the service, when the processes are distinguished based on the configuration direction, the first terminal sends the first connection management information according to the address, the bearer or the QoS flow corresponding to the configuration direction. The configuration direction is used for indicating the control terminal in the first terminal and the second terminal. When the configuration direction is a first configuration direction, the first terminal is a control terminal of the service, and when the configuration direction is a second configuration direction, the second terminal is a control terminal of the service.

In a possible implementation, the first terminal may send the first connection management information corresponding to the first service to the second terminal in at least one of the following ways:

1. sending the first connection management information to the second terminal according to a target address corresponding to a configuration direction;

2. sending the first connection management information to the second terminal according to a source address corresponding to the configuration direction;

3. sending the first connection management information to the second terminal through a second bearer corresponding to the configuration direction; and 4. sending the first connection management information to the second terminal through a second QoS flow corresponding to the configuration direction.

Optionally, the first connection management information includes at least one of a direction identifier of the configuration direction, a second bearer identifier corresponding to the configuration direction, and a second QoS flow identifier corresponding to the configuration direction.

Accordingly, the second terminal may send the response information to the first terminal in at least one of the following ways:

1. sending the first response information to the first terminal according to the source address corresponding to the configuration direction;

2. sending the first response information to the first terminal according to the target address corresponding to the configuration direction;

3. sending the first response information to the first terminal through the second bearer corresponding to the configuration direction; and 4. sending the first response information to the first terminal through the second QoS flow corresponding to the configuration direction.

Optionally, the first response information includes at least one of a direction identifier of the configuration direction, a second bearer identifier corresponding to the configuration direction, and a second QoS flow identifier corresponding to the configuration direction.

Figure 5:
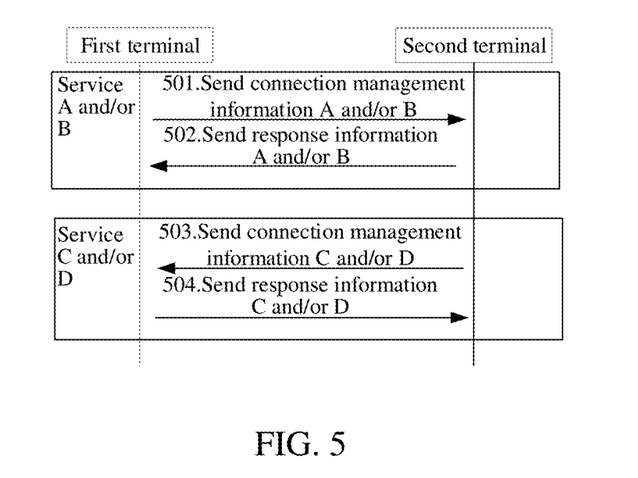
FIG. 5 is a schematic diagram of an implementation process of a method for connection management provided according to a further example implementation.

For the convenience of understanding, in an example, based on service A, service B, service C and service D, the connection management process between the first terminal and the second terminal is as shown in FIG. 5. The first terminal serves as a control terminal for service A and service B, and the second terminal serves as a control terminal for service C and service D.

In act 501, the first terminal sends connection management information A and/or B to the second terminal.

Since the configuration directions of service A and service B are both the first configuration direction (the first terminal is the control terminal), the connection management processes of service A and service B may not be distinguished.

In act 502, the second terminal sends response information A and/or B to the first terminal.

In act 503, the first terminal sends connection management information C and/or D to the second terminal.

Since the configuration directions of service C and service D are both the second configuration direction (the second terminal is the control terminal), which is different from the first configuration direction, the processes of services C and D are distinguished from the processes of services A and B.

In act 504, the second terminal sends response information C and/or D to the first terminal.

In addition, as to the contents contained in the first connection management information and the first response information in this implementation, reference may be made to the implementations of FIGS. 3 and 4, which will not be described in further detail here in this implementation.

If part of the connection configuration parameters are managed according to services, signaling overhead may be increased and even management cannot be performed according to a service, therefore, on the basis of the above implementation, in a possible implementation, part of the connection managements are performed based on services, while another part of the connection managements are performed based on link direction.

Figure 6:
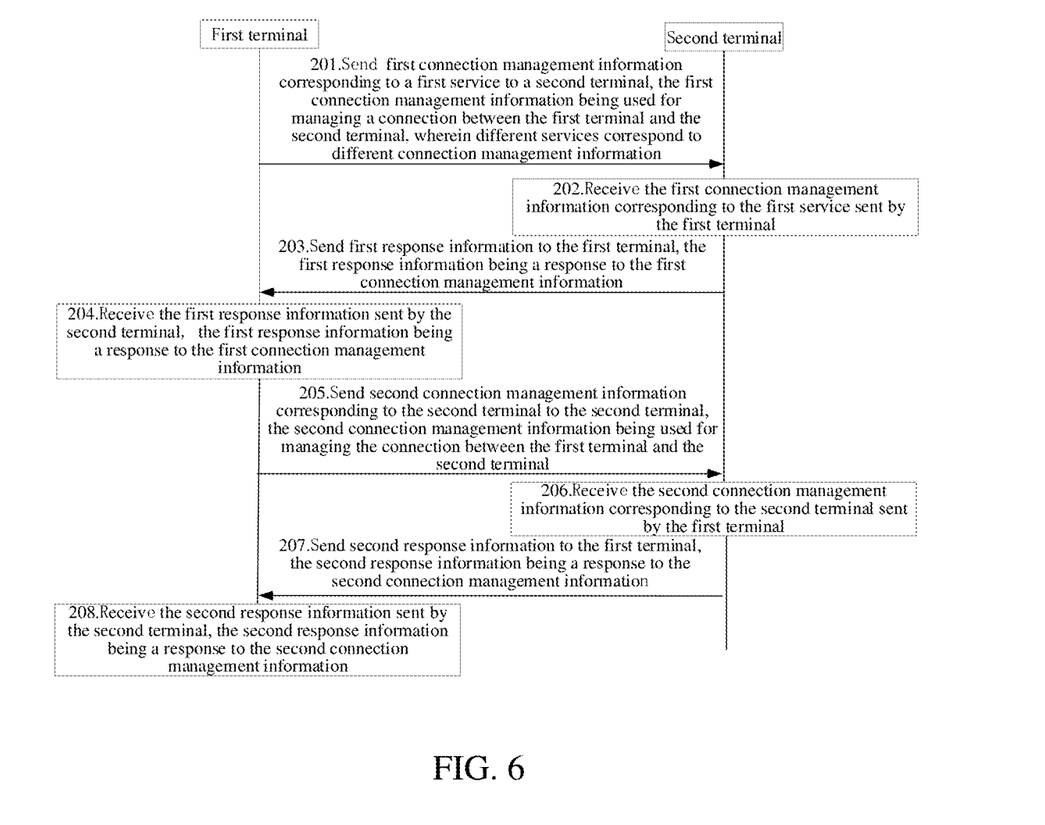
FIG. 6 is a flow chart of a method for connection management provided according to another implementation of the present disclosure.

On the basis of FIG. 2, as shown in FIG. 6, when connection management is performed based on links, the method further includes the following acts 205-208.

In act 205, the first terminal sends second connection management information corresponding to the second terminal to the second terminal, the second connection management information being used for managing the connection between the first terminal and the second terminal.

Different services are not distinguished for the second connection management information.

Optionally, for a forward link from the first terminal to the second terminal, the second connection management information sent by the first terminal includes at least one of a terminal identifier of the second terminal, a third bearer identifier corresponding to the second terminal and a third QoS flow identifier corresponding to the second terminal.

Accordingly, for a reverse link, third connection management information sent by the second terminal to the first terminal includes at least one of a terminal identifier of the first terminal, a bearer identifier corresponding to the first terminal and a QoS flow identifier corresponding to the first terminal.

In a possible implementation, the first terminal may send the second connection management information to the second terminal in at least one of the following ways:
1. sending the second connection management information to the second terminal according to a target address corresponding to the second terminal;
2. sending the second connection management information to the second terminal according to a source address corresponding to the second terminal;
3. sending the second connection management information to the second terminal through a third bearer corresponding to the second terminal; and
4. sending the second connection management information to the second terminal through a third QoS flow corresponding to the second terminal.

In act 206, the second terminal receives the second connection management information corresponding to the second terminal sent by the first terminal.

In act 207, the second terminal sends second response information to the first terminal, the second response information being a response to the second connection management information.

Different services are not distinguished for the second response information.

Optionally, the second response information sent by the second terminal includes at least one of a terminal identifier of the second terminal, a third bearer identifier corresponding to the second terminal and a third QoS flow identifier corresponding to the second terminal.

In a possible implementation, the second terminal may send the second response information to the first terminal in at least one of the following ways:
1. sending the second response information to the first terminal according to a source address corresponding to the second terminal;
2. sending the second response information to the first terminal according to a target address corresponding to the second terminal;
3. sending the second response information to the first terminal through a third bearer corresponding to the second terminal; and
4. sending the second response information to the first terminal through a third QoS flow corresponding to the second terminal.

In act 208, the first terminal receives the second response information sent by the second terminal, the second response information being a response to the second connection management information.

Different from the first connection management information (or the first response information) in which the content is directed to services, the content in the second connection management information (or the second response information) is directed to terminals (i.e., services are not distinguished).

In a possible implementation, the second connection management information includes at least one of second connection setup information, second connection release information, second connection measurement information, second connection configuration information and second capability reporting information.

The second connection setup information is used for indicating to set up the connection corresponding to the second terminal.

The second connection release information is used for indicating to release the connection corresponding to the second terminal.

The second connection measurement information is used for indicating to measure the connection corresponding to the second terminal.

The second connection configuration information includes a network MAC layer configuration and/or a physical layer (PHY) layer configuration.

The second capability reporting information is used for indicating the second terminal to report a third capability and/or a fourth capability, the third capability refers to a terminal available capability of the second terminal, and the fourth capability includes a MAC layer capability and/or a PHY layer capability.

Accordingly, the second response information includes at least one of a second connection setup response, a second connection release response, a second connection measurement report, a second connection configuration response and a second capability report.

The second connection setup response is a response when the connection corresponding to the second terminal is set up.

The second connection release response is a response when the connection corresponding to the second terminal is released.

The second connection measurement report refers to a measurement result of the connection corresponding to the second terminal.

The second connection configuration response includes a MAC layer configuration and/or a PHY layer configuration.

The second capability report includes a third capability and/or a fourth capability, the third capability refers to a terminal available capability of the second terminal, and the fourth capability includes a MAC layer capability and/or a PHY layer capability.

Figure 7:
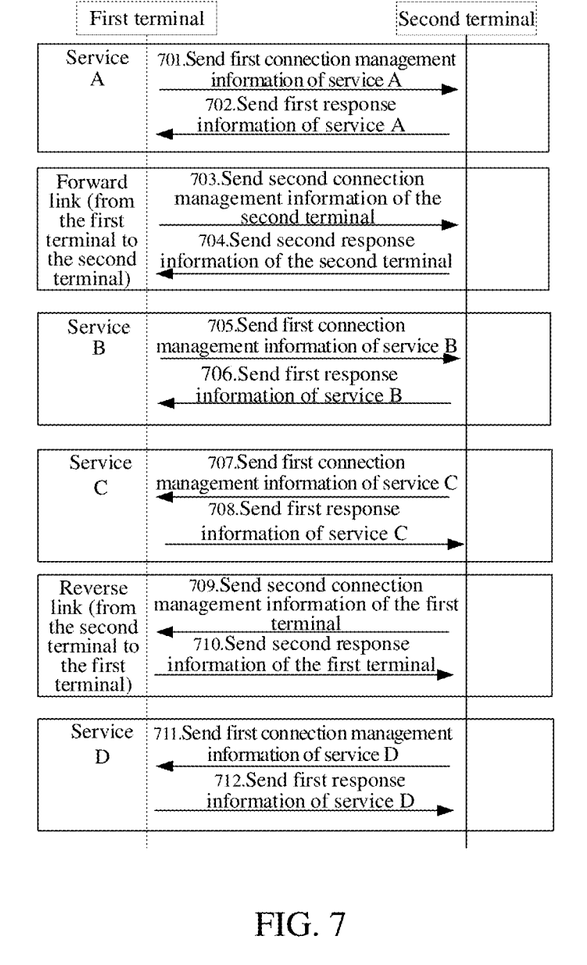
FIG. 7 is a schematic diagram of an implementation process of a method for connection management provided according to a further example implementation.

In an example, based on service A, service B, service C and service D, the connection management process between the first terminal and the second terminal is as shown in FIG. 7. The first terminal serves as a control terminal for service A and service B, and the second terminal serves as a control terminal for service C and service D.

In act 701, the first terminal sends first connection management information of service A to the second terminal.

In act 702, the second terminal sends first response information of service A to the first terminal.

In act 703, the first terminal sends second connection management information of the second terminal to the second terminal.

In act 704, the second terminal sends second response information of the second terminal to the first terminal.

In act 705, the first terminal sends first connection management information of service B to the second terminal.

In act 706, the second terminal sends first response information of service B to the first terminal.

In act 707, the second terminal sends first connection management information of service C to the first terminal.

In act 708, the first terminal sends first response information of service C to the second terminal.

In act 709, the second terminal sends second connection management information of the first terminal to the first terminal.

In act 710, the first terminal sends second response information of the first terminal to the second terminal.

In act 711, the second terminal sends first connection management information of service D to the first terminal.

In act 712, the first terminal sends first response information of service D to the second terminal.

The following is apparatus implementations of the implementations of the present disclosure. As to the parts which are not described in details in the apparatus implementations, reference may be made to the technical details disclosed in the above method implementations.

Figure 8:
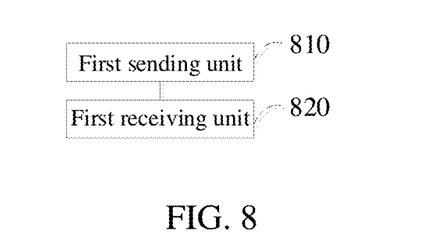
FIG. 8 is a schematic structure diagram of an apparatus for connection management provided according to an implementation of the present disclosure.

Referring to FIG. 8, FIG. 8 is a schematic structure diagram of an apparatus for connection management provided according to an implementation of the present disclosure. The apparatus may be implemented as all or a part of the first terminal through software, hardware, or a combination of software and hardware. The apparatus includes a first sending unit 810 and a first receiving unit 820.

The first sending unit 810 is configured to send first connection management information corresponding to a first service to a second terminal, the first connection management information being used for managing a connection between a first terminal and the second terminal, wherein different services correspond to different connection management information.

The first receiving unit 820 is configured to receive first response information sent by the second terminal, the first response information being a response to the first connection management information.

Optionally, the first connection management information includes at least one of a service identifier of the first service, a first bearer identifier corresponding to the first service, and a first Quality of Service (QoS) flow identifier corresponding to the first service.

Optionally, the first sending unit 810 is configured to implement at least one of the following functions:

sending the first connection management information to the second terminal according to a target address corresponding to the first service;

sending the first connection management information to the second terminal according to a source address corresponding to the first service;

sending the first connection management information to the second terminal through a first bearer corresponding to the first service; and sending the first connection management information to the second terminal through a first QoS flow corresponding to the first service.

Optionally, the first connection management information includes at least one of a direction identifier of a configuration direction, a second bearer identifier corresponding to the configuration direction and a second QoS flow identifier corresponding to the configuration direction, the configuration direction being used for indicating a control terminal in the first terminal and the second terminal.

Optionally, the first sending unit 810 is configured to implement at least one of the following functions:

sending the first connection management information to the second terminal according to a target address corresponding to a configuration direction;

sending the first connection management information to the second terminal according to a source address corresponding to the configuration direction;

sending the first connection management information to the second terminal through a second bearer corresponding to the configuration direction; and sending the first connection management information to the second terminal through a second QoS flow corresponding to the configuration direction.

Optionally, the first connection management information includes at least one of first connection setup information, first connection release information, first connection measurement information, first connection configuration information and first capability reporting information.

The first connection setup information is used for indicating to set up a connection corresponding to the first service.

The first connection release information is used for indicating to release the connection corresponding to the first service.

The first connection measurement information is used for indicating to measure the connection corresponding to the first service.

The first connection configuration information includes at least one of a Service Data Adaptation Protocol (SDAP) protocol layer configuration, a Packet Data Convergence Protocol (PDCP) protocol layer configuration, and a Radio Link Control (RLC) protocol layer configuration.

The first capability reporting information is used for indicating the second terminal to report a first capability and/or a second capability, the first capability refers to an available capability of the second terminal for the first service, and the second capability includes at least one of an SDAP protocol layer capability, a PDCP protocol layer capability and an RLC protocol layer capability.

Optionally, the apparatus further includes a second sending unit and a second receiving unit.

The second sending unit is configured to send second connection management information corresponding to the second terminal to the second terminal, the second connection management information being used for managing a connection between the first terminal and the second terminal.

The second receiving unit is configured to receive second response information sent by the second terminal, the second response information being a response to the second connection management information.

Optionally, different services are not distinguished for the second connection management information and the second response information.

Optionally, the second connection management information includes at least one of a terminal identifier of the second terminal, a third bearer identifier corresponding to the second terminal, and a third Quality of Service (QoS) flow identifier corresponding to the second terminal.

Optionally, the second sending unit is configured to implement at least one of the following functions:

sending the second connection management information to the second terminal according to a target address corresponding to the second terminal;

sending the second connection management information to the second terminal according to a source address corresponding to the second terminal;

sending the second connection management information to the second terminal through a third bearer corresponding to the second terminal; and sending the second connection management information to the second terminal through a third QoS flow corresponding to the second terminal.

Optionally, the second connection management information includes at least one of second connection setup information, second connection release information, second connection measurement information, second connection configuration information, and second capability reporting information.

The second connection setup information is used for indicating to set up a connection corresponding to the second terminal.

The second connection release information is used for indicating to release the connection corresponding to the second terminal.

The second connection measurement information is used for indicating to measure the connection corresponding to the second terminal.

The second connection configuration information includes a network MAC layer configuration and/or a physical layer (PHY) layer configuration.

The second capability reporting information is used for indicating the second terminal to report a third capability and/or a fourth capability, the third capability refers to a terminal available capability of the second terminal, and the fourth capability includes a MAC layer capability and/or a PHY layer capability.

Figure 9:
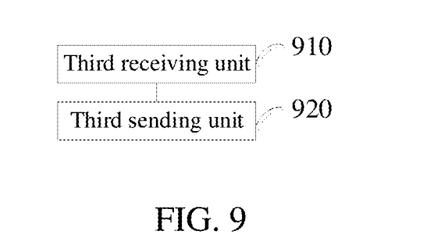
FIG. 9 is a schematic structure diagram of an apparatus for connection management provided according to an implementation of the present disclosure.

Referring to FIG. 9, FIG. 9 is a schematic structure diagram of an apparatus for connection management provided according to an implementation of the present disclosure. The apparatus may be implemented as all or a part of the second terminal through software, hardware, or a combination of software and hardware. The apparatus includes a third receiving unit 910 and a third sending unit 920.

The third receiving unit 910 is configured to receive first connection management information corresponding to a first service sent by a first terminal, the first connection management information being used for managing a connection between the first terminal and a second terminal, wherein different services correspond to different connection management information.

The third sending unit 920 is configured to send first response information to the first terminal, the first response information being a response to the first connection management information.

Optionally, the first response information includes at least one of a service identifier of the first service, a first bearer identifier corresponding to the first service, and a first Quality of Service (QoS) flow identifier corresponding to the first service.

Optionally, the third sending unit 920 is configured to implement at least one of the following functions:

sending the first response information to the first terminal according to a source address corresponding to the first service;

sending the first response information to the first terminal according to a target address corresponding to the first service;

sending the first response information to the first terminal through a first bearer corresponding to the first service; and sending the first response information to the first terminal through a first QoS flow corresponding to the first service.

Optionally, the first response information includes at least one of a direction identifier of a configuration direction, a second bearer identifier corresponding to the configuration direction, and a second QoS flow identifier corresponding to the configuration direction, the configuration direction being used for indicating a control terminal in the first terminal and the second terminal.

Optionally, the third sending unit 920 is configured to implement at least one of the following functions:

sending the first response information to the first terminal according to a source address corresponding to the configuration direction;

sending the first response information to the first terminal according to a target address corresponding to the configuration direction;

sending the first response information to the first terminal through a second bearer corresponding to the configuration direction; and sending the first response information to the first terminal through a second QoS flow corresponding to the configuration direction.

Optionally, the first response information includes at least one of a first connection setup response, a first connection release response, a first connection measurement report, a first connection configuration response, and a first capability report.

The first connection setup response is a response when the connection corresponding to the first service is set up.

The first connection release response is a response when the connection corresponding to the first service is released.

The first connection measurement report refers to a measurement result of the connection corresponding to the first service.

The first connection configuration response includes at least one of an SDAP protocol layer configuration, a PDCP protocol layer configuration and an RLC protocol layer configuration.

The first capability report includes a first capability and/or a second capability, the first capability refers to an available capability of the second terminal for the first service, and the second capability includes at least one of an SDAP protocol layer capability, a PDCP protocol layer capability and an RLC protocol layer capability.

Optionally, the apparatus further includes a fourth receiving unit and a fourth sending unit.

The fourth receiving unit is configured to receive second connection management information corresponding to the second terminal sent by the first terminal, the second connection management information being used for managing the connection between the first terminal and the second terminal.

The fourth sending unit is configured to send second response information to the first terminal, the second response information being a response to the second connection management information.

Optionally, different services are not distinguished for the second connection management information and the second response information.

Optionally, the second response information includes at least one of a terminal identifier of the second terminal, a third bearer identifier corresponding to the second terminal, and a third Quality of Service (QoS) flow identifier corresponding to the second terminal.

Optionally, the fourth sending unit is configured to implement at least one of the following functions:

sending the second response information to the first terminal according to a source address corresponding to the second terminal;

sending the second response information to the first terminal according to a target address corresponding to the second terminal;

sending the second response information to the first terminal through a third bearer corresponding to the second terminal; and sending the second response information to the first terminal through a third QoS flow corresponding to the second terminal.

Optionally, the second response information includes at least one of a second connection setup response, a second connection release response, a second connection measurement report, a second connection configuration response and a second capability report.

The second connection setup response is a response when a connection corresponding to the second terminal is set up.

The second connection release response is a response when the connection corresponding to the second terminal is released.

The second connection measurement report refers to a measurement result of the connection corresponding to the second terminal.

The second connection configuration response includes a network MAC layer configuration and/or a physical layer (PHY) layer configuration.

The second capability report includes a third capability and/or a fourth capability, the third capability refers to a terminal available capability of the second terminal, and the fourth capability includes a MAC layer capability and/or a PHY layer capability.

Figure 10:
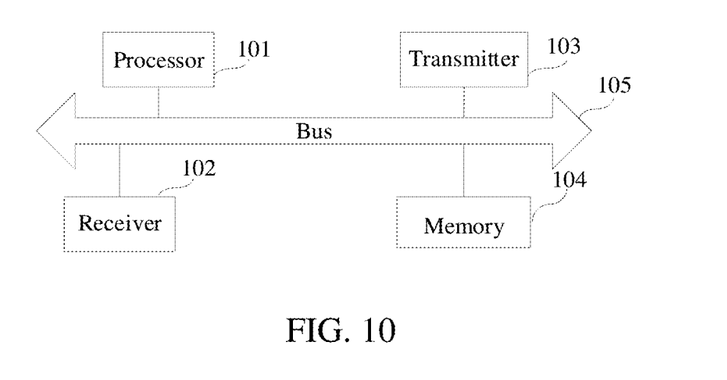
FIG. 10 is a schematic structure diagram of a terminal provided according to an example implementation of the present disclosure.

Referring to FIG. 10, FIG. 10 is a schematic structure diagram of a terminal provided according to an example implementation of the present disclosure. The terminal may be implemented as a first terminal 120 or a second terminal 140. The terminal includes a processor 101, a receiver 102, a transmitter 103, a memory 104 and a bus 105.

The processor 101 includes one or more processing cores. The processor 101 performs various functional applications and information processing by running software programs and modules.

The receiver 102 and the transmitter 103 may be implemented as a communication component, which may be a communication chip.

The memory 104 is connected to the processor 101 via the bus 105.

The memory 104 may be used for storing at least one instruction, and the processor 101 is used for executing the at least one instruction to implement various acts executed by the first terminal or the second terminal in the above method implementations.

In addition, the memory 104 may be implemented by any type of transitory or non-transitory storage device or a combination thereof. The transitory or non-transitory storage device includes, but is not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory and a programmable read only memory (PROM).

The present disclosure provides a computer-readable storage medium, storing at least one instruction which is loaded and executed by the processor to implement the method for connection management provided according to the above various method implementations.

The present disclosure further provides a computer program product, which, when run on a terminal, causes the terminal to perform the method for connection management provided according to the above various method implementations.

Those skilled in the art should realize that, in one or more examples described above, the functions described in implementations of the present disclosure may be implemented by using hardware, software, firmware or any combination thereof. When implemented by software, these functions may be stored in a computer-readable medium or serve as one or more instructions or codes on the computer-readable medium for transmission. The computer-readable medium includes a computer storage medium and a communication medium. The communication medium includes any medium for transmitting computer programs from one place to another place conveniently, and the storage medium may be any available medium which can be accessed by a general-purpose computer or a special-purpose computer.

The above descriptions are only preferred implementations of the present disclosure and are not intended to limit the present disclosure. Any modification, equivalent substitution, improvement, etc. made within the spirit and principles of the present disclosure shall be included within the protection scope of the present disclosure.

What is claimed is:

1. A method for connection management, comprising:
   sending, by a first terminal, first connection management information corresponding to a first service to a second terminal, wherein the first connection management information is used for managing a connection between the first terminal and the second terminal, wherein different services correspond to different connection management information; and
   receiving, by the first terminal, first response information sent by the second terminal, wherein the first response information is a response to the first connection management information;

wherein the first connection management information comprises a direction identifier of a configuration direction of a service; wherein the configuration direction is used for indicating a control terminal of the service in the first terminal and the second terminal, when the configuration direction is a first configuration direction of the service, the first terminal is a control terminal of the service, and when the configuration direction is a second configuration direction of the service, the second terminal is a control terminal of the service;

wherein different services in a same service configuration direction are not distinguished for a connection management process and connection management processes for different service configuration directions are distinguished;

wherein sending, by the first terminal, the first connection management information corresponding to the first service to the second terminal comprises:

sending, by the first terminal, the first connection management information to the second terminal according to a source address corresponding to the second configuration direction of the service, wherein the second terminal is the control terminal of the service.

2. The method of claim 1, wherein the first connection management information comprises at least one of first connection setup information, first connection release information, first connection measurement information, first connection configuration information, and first capability reporting information;

the first connection setup information is used for indicating to set up a connection corresponding to the service;
the first connection release information is used for indicating to release the connection corresponding to the service;
the first connection measurement information is used for indicating to measure the connection corresponding to the service;
wherein the first connection configuration information comprises at least one of a Service Data Adaptation Protocol (SDAP) protocol layer configuration, a Packet Data Convergence Protocol (PDCP) protocol layer configuration, and a Radio Link Control (RLC) protocol layer configuration;
the first capability reporting information is used for indicating the second terminal to report a first capability and/or a second capability, the first capability refers to an available capability of the second terminal for the service, and the second capability comprises at least one of an SDAP protocol layer capability, a PDCP protocol layer capability, and an RLC protocol layer capability.

3. The method of claim 1, further comprising:
sending, by the first terminal, second connection management information corresponding to the second terminal to the second terminal, wherein the second connection management information is used for managing the connection between the first terminal and the second terminal; and
receiving, by the first terminal, second response information sent by the second terminal, wherein the second response information is a response to the second connection management information.

4. The method of claim 3, wherein the second connection management information comprises at least one of a terminal identifier of the second terminal, a third bearer identifier corresponding to the second terminal, and a third Quality of Service (QoS) flow identifier corresponding to the second terminal.

5. The method of claim 3, wherein the first terminal sends the second connection management information corresponding to the second terminal to the second terminal in at least one of the following ways:

sending, by the first terminal, the second connection management information to the second terminal according to a target address corresponding to the second terminal;
sending, by the first terminal, the second connection management information to the second terminal according to a source address corresponding to the second terminal;
sending, by the first terminal, the second connection management information to the second terminal through a third bearer corresponding to the second terminal; and
sending, by the first terminal, the second connection management information to the second terminal through a third QoS flow corresponding to the second terminal, wherein the second connection management information comprises at least one of second connection setup information, second connection release information, second connection measurement information, second connection configuration information, and second capability reporting information;
the second connection setup information is used for indicating to set up a connection corresponding to the second terminal;
the second connection release information is used for indicating to release the connection corresponding to the second terminal;
the second connection measurement information is used for indicating to measure the connection corresponding to the second terminal;
the second connection configuration information comprises a network MAC layer configuration and/or a physical layer (PHY) layer configuration;
the second capability reporting information is used for indicating the second terminal to report a third capability and/or a fourth capability, the third capability refers to a terminal available capability of the second terminal, and the fourth capability comprises a MAC layer capability and/or a PHY layer capability.

6. A method for connection management, comprising:
receiving, by a second terminal, first connection management information corresponding to a first service sent by a first terminal, wherein the first connection management information is used for managing a connection between the first terminal and the second terminal, wherein different services correspond to different connection management information; and
sending, by the second terminal, first response information to the first terminal, wherein the first response information is a response to the first connection management information;
wherein the first connection management information comprises a direction identifier of a configuration direction of a service; wherein the configuration direction is used for indicating a control terminal of the service in the first terminal and the second terminal, when the configuration direction is a first configuration direction of the service, the first terminal is a control terminal of the service, and when the configuration direction is a second configuration direction of the service, the second terminal is a control terminal of the service;

wherein different services in a same service configuration direction are not distinguished for a connection management process and connection management processes for different service configuration directions are distinguished;

wherein sending, by the first terminal, the first connection management information corresponding to the first service to the second terminal comprises:

sending, by the first terminal, the first connection management information to the second terminal according to a source address corresponding to the second configuration direction of the service, wherein the second terminal is the control terminal of the service.

7. The method of claim 6, wherein the first response information comprises at least one of a first connection setup response, a first connection release response, a first connection measurement report, a first connection configuration response, and a first capability report;

the first connection setup response is a response when a connection corresponding to the service is set up;

the first connection release response is a response when the connection corresponding to the service is released;

the first connection measurement report refers to a measurement result of the connection corresponding to the service;

the first connection configuration response comprises at least one of an SDAP protocol layer configuration, a PDCP protocol layer configuration and an RLC protocol layer configuration;

the first capability report comprises a first capability and/or a second capability, the first capability refers to an available capability of the second terminal for the service, and the second capability comprises at least one of an SDAP protocol layer capability, a PDCP protocol layer capability, and an RLC protocol layer capability.

8. An apparatus for connection management, comprising:

a first transmitter, configured to send first connection management information corresponding to a first service to a second terminal, wherein the first connection management information is used for managing a connection between a first terminal and the second terminal, wherein different services correspond to different connection management information; and a first receiver, configured to receive first response information sent by the second terminal, wherein the first response information is a response to the first connection management information;

wherein the first connection management information comprises a direction identifier of a configuration direction of a service; wherein the configuration direction is used for indicating a control terminal of the service in the first terminal and the second terminal, when the configuration direction is a first configuration direction of the service, the first terminal is a control terminal of the service, and when the configuration direction is a second configuration direction of the service, the second terminal is a control terminal of the service;

wherein different services in a same service configuration direction are not distinguished for a connection management process and connection management processes for different service configuration directions are distinguished;

wherein sending, by the first terminal, the first connection management information corresponding to the first service to the second terminal comprises:

sending, by the first terminal, the first connection management information to the second terminal according to a source address corresponding to the second configuration direction of the service, wherein the second terminal is the control terminal of the service.

9. The apparatus of claim 8 wherein the first connection management information comprises at least one of first connection setup information, first connection release information, first connection measurement information, first connection configuration information and first capability reporting information;

the first connection setup information is used for indicating to set up a connection corresponding to the service;

the first connection release information is used for indicating to release the connection corresponding to the service;

the first connection measurement information is used for indicating to measure the connection corresponding to the service;

the first connection configuration information comprises at least one of a Service Data Adaptation Protocol (SDAP) protocol layer configuration, a Packet Data Convergence Protocol (PDCP) protocol layer configuration, and a Radio Link Control (RLC) protocol layer configuration;

the first capability reporting information is used for indicating the second terminal to report a first capability and/or a second capability, the first capability refers to an available capability of the second terminal for the service, and the second capability comprises at least one of an SDAP protocol layer capability, a PDCP protocol layer capability and an RLC protocol layer capability.

10. An apparatus for connection management, comprising:

a third receiver, configured to receive first connection management information corresponding to a first service sent by a first terminal, wherein the first connection management information is used for managing a connection between the first terminal and a second terminal, wherein different services correspond to different connection management information; and a third transmitter, configured to send first response information to the first terminal, wherein the first response information is a response to the first connection management information;

wherein the first connection management information comprises a direction identifier of a configuration direction of a service; wherein the configuration direction is used for indicating a control terminal of the service in the first terminal and the second terminal, when the configuration direction is a first configuration direction of the service, the first terminal is a control terminal of the service, and when the configuration direction is a second configuration direction of the service, the second terminal is a control terminal of the service;

wherein different services in a same service configuration direction are not distinguished for a connection management process and connection management processes for different service configuration directions are distinguished;

wherein sending, by the first terminal, the first connection management information corresponding to the first service to the second terminal comprises:

sending, by the first terminal, the first connection management information to the second terminal according to a source address corresponding to the second configuration direction of the service, wherein the second terminal is the control terminal of the service.

11. The apparatus of claim 10, wherein the first response information comprises at least one of a first connection setup response, a first connection release response, a first connection measurement report, a first connection configuration response, and a first capability report;

the first connection setup response is a response when a connection corresponding to the service is set up;

the first connection release response is a response when the connection corresponding to the service is released;

the first connection measurement report refers to a measurement result of the connection corresponding to the service;

the first connection configuration response comprises at least one of an SDAP protocol layer configuration, a PDCP protocol layer configuration and an RLC protocol layer configuration;

the first capability report comprises a first capability and/or a second capability, the first capability refers to an available capability of the second terminal for the service, and the second capability comprises at least one of an SDAP protocol layer capability, a PDCP protocol layer capability, and an RLC protocol layer capability.

* * * * *